(12) United States Patent
Ye et al.

(10) Patent No.: US 8,286,001 B2
(45) Date of Patent: Oct. 9, 2012

(54) METHOD AND CENTRAL PROCESSING UNIT FOR PROCESSING ENCRYPTED SOFTWARE

(75) Inventors: Hang J. Ye, Beijing (CN); Tao Zhou, Beijing (CN); Weikai Xie, Shanghai (CN); Guo H. Lin, Beijing (CN); Yi Ge, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 12/173,112

(22) Filed: Jul. 15, 2008

(65) Prior Publication Data

US 2009/0019290 A1    Jan. 15, 2009

Related U.S. Application Data

(63) Continuation of application No. 11/493,448, filed on Jul. 26, 2006.

(30) Foreign Application Priority Data

Jul. 27, 2005   (CN) .......................... 2005 1 0087314

(51) Int. Cl.
    *H04L 29/06*   (2006.01)
(52) U.S. Cl. ........................................ 713/189; 380/277
(58) Field of Classification Search ................ 380/277
    See application file for complete search history.

(56) References Cited

U.S. PATENT DOCUMENTS

| 7,533,276 | B2 | 5/2009 | Matsushima et al. |
| 7,707,645 | B2 | 4/2010 | Haruki et al. |
| 2002/0051536 | A1 | 5/2002 | Shirakawa et al. |
| 2002/0114465 | A1 | 8/2002 | Shen-Orr et al. |

(Continued)

FOREIGN PATENT DOCUMENTS

JP       07-295802 A    11/1995

(Continued)

OTHER PUBLICATIONS

Office Action dated Oct. 8, 2009, received in related U.S. Appl. No. 11/493,448.

(Continued)

*Primary Examiner* — Jeffrey Pwu
*Assistant Examiner* — Michael D Anderson
(74) *Attorney, Agent, or Firm* — Scully, Scott, Murphy & Presser, P.C.; William Stock, Esq.

(57) ABSTRACT

The present invention provides a central processing unit for processing at least one encrypted software. The encrypted software comprises at least one encrypted software section. The encrypted software section is encrypted with a management key MK, and the MK being encrypted with a device key DK as a encrypted MK. The central processing unit comprises processing and cache unit, and cryptographic unit. The cryptographic unit comprises device key storage unit for storing the DK, a plurality of management key storage units for storing MKs, wherein each management key storage unit corresponding to a management key index MKI, and decryption unit. The decryption unit decrypts a encrypted MK with the DK to obtain a MK, stores the MK to a management key storage unit, and output a MKI corresponding to the management key storage unit, thus the MKI is used to correspond to the encrypted software section. Wherein, the decryption unit invokes corresponding MK according to the MKI and decrypts the encrypted software section, and directly transfers the decrypted software code and/or data to the processing and cache unit.

15 Claims, 1 Drawing Sheet

U.S. PATENT DOCUMENTS

| | | |
|---|---|---|
| 2002/0131601 A1 | 9/2002 | Ninomiya et al. |
| 2003/0133574 A1* | 7/2003 | Caronni et al. ............... 380/277 |
| 2009/0150685 A1 | 6/2009 | Matsushima et al. |

FOREIGN PATENT DOCUMENTS

| | | |
|---|---|---|
| JP | 2005-100378 A | 4/2005 |
| JP | 2006-072963 A | 3/2006 |

OTHER PUBLICATIONS

Office Action dated May 5, 2010, received in related U.S. Appl. No. 11/493,448.

* cited by examiner

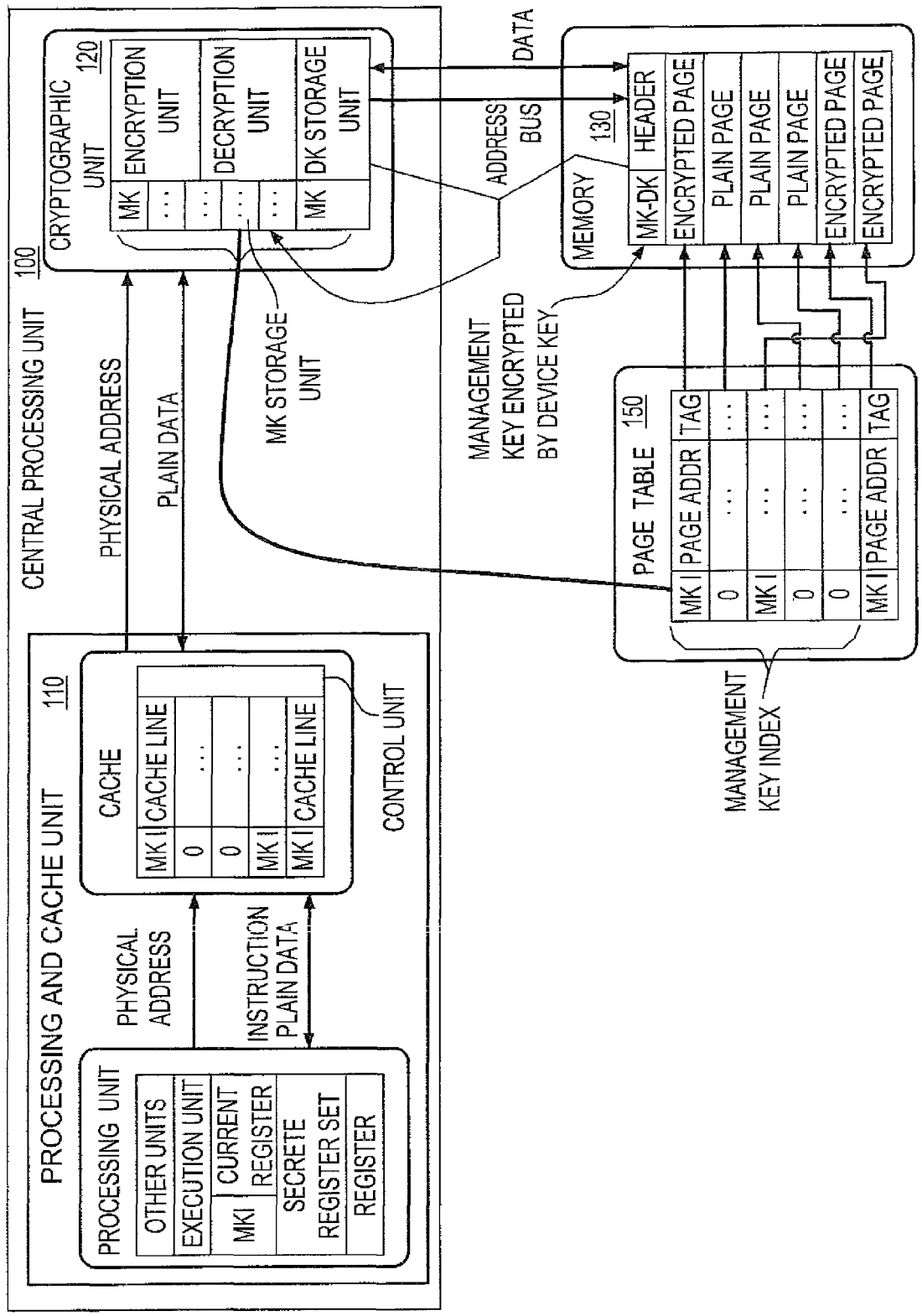

METHOD AND CENTRAL PROCESSING UNIT FOR PROCESSING ENCRYPTED SOFTWARE

CROSS-REFERENCE TO RELATED APPLICATION

This application is a continuation application of co-pending application Ser. No. 11/493,448, filed Jul. 26, 2006, for "Method and Central Processing Unit for Processing Encrypted Software," the disclosure of which is herein incorporated by reference in its entirety.

BACKGROUND OF THE INVENTION

1. Field of the Invention

The present invention relates to information security technology, and more particularly relates to method and central processing unit for processing encrypted software.

2. Background Art

In general, tamper-resistance technology protects devices in an insecure environment free from modifying or subverting by physical or other attack means. For the software, the tamper-resistance technology prevents malicious users from extracting secrets, e.g. secret keys, proprietary algorithms, etc., by analyzing or tampering software programs. The main application scenario is to protect the software content with sensitive data/code in a hostile environment.

Most traditional software tamper-resistance technologies are based on software approaches. These methods encrypt the sensitive data/code of software to increase the bar that malicious users steal the secrets. But with the software encryption approaches, all encrypted data/code must be eventually decrypted by some software routine into plain form, then transfer to CPU. Malicious users could intercept the software in plain form to obtain information.

Several hardware-based approaches are also proposed to realize the tamper-resistant software, but all are based on proprietary architectures and work as coprocessors. A typical architecture is to pack a separate processor, volatile storage (e.g. RAM), non-volatile storage (e.g. flash memory), and cryptographic engine into one package, and communicate with main computer via external bus as a coprocessor. This architecture is suitable for specific purpose software, e.g. ATM software. But it is difficult to develop general purpose software with tamper-resistance since protected program must run on the coprocessor instead of CPU with this architecture and it would limit the working, development, deployment, and distribution of software much.

SUMMARY OF THE INVENTION

In view of the deficiency of the existing technology, one problem to be solved by the present invention is to provide an improved central processing unit CPU, wherein decrypted data and/or code are directly processed by the CPU.

According to one aspect, the present invention provides a central processing unit for processing at least one encrypted software. The encrypted software comprises at least one encrypted software section. The encrypted software section is encrypted with a management key MK, and the MK being encrypted with a device key DK as a encrypted MK. The central processing unit comprises processing and cache unit, and cryptographic unit. The cryptographic unit comprises device key storage unit for storing the DK, a plurality of management key storage units for storing MKs, wherein each management key storage unit corresponding to a management key index MKI, and decryption unit. The decryption unit decrypts a encrypted MK with the DK to obtain a MK, stores the MK to a management key storage unit, and output a MKI corresponding to the management key storage unit, thus the MKI is used to correspond to the encrypted software section. The decryption unit invokes corresponding MK according to the MKI and decrypts the encrypted software section, and directly transfers the decrypted software code and/or data to the processing and cache unit.

According to another aspect, the present invention provides a method for processing at least one encrypted software with a central processing unit. The central processing unit comprises a processing and cache unit, and a cryptographic unit. The cryptographic unit comprises decryption unit, device key storage unit for storing a DK, and a plurality of management key storage units for storing MKs. Each management key storage unit corresponds to a management key index MKI, and the encrypted software is encrypted with a management key MK, the MK is encrypted with a device key DK as an encrypted MK. In the method, the encrypted MK corresponding to the encrypted software is stored into the cryptographic unit. The decryption unit decrypts an encrypted MK with the DK to obtain a MK. Then, store the MK in a management key storage unit, and obtain a MKI corresponding to the management key storage unit. Thus, the MKI is associated with the encrypted software. Corresponding MK is invoked according to the MKI and the encrypted software is decrypted with the MK in the cryptographic unit. The decrypted software code and/or data are directly transferred to the processing and cache unit. The processing and cache unit processes the decrypted software.

BRIEF DESCRIPTION OF THE DRAWING

FIG. 1 is a block diagram according to one embodiment of the present invention.

DETAILED DESCRIPTION OF THE PREFERRED EMBODIMENTS

The detailed description of preferable embodiment according to the present invention will be illustrated with the attached FIGURE as following.

FIG. 1 is a block diagram according to one embodiment of the present invention. The central processing unit CPU 100 is for processing at least one encrypted software. The encrypted software comprises at least one encrypted software section. For example, the software stored in a flash memory 130 comprises a plurality of encrypted sections and a plurality of unencrypted sections. Encrypted pages store the encrypted sections of the software, and plain pages store the unencrypted sections. The encrypted software sections are encrypted with a management key MK. The MK is encrypted with a device key DK related with the CPU as an encrypted MK. The management key encrypted by the device key is illustrated as MK-DK in the FIGURE.

The central processing unit comprises processing and cache unit 110, and cryptographic unit 120. The cryptographic unit 120 comprises: device key storage unit for storing the DK corresponding to the CPU; a plurality of management key storage units for storing MKs, wherein each management key storage unit corresponds to a management key index MKI; decryption unit for decrypting a encrypted MK with the DK to obtain a MK, storing the MK to a management key storage unit; and outputting a MKI corresponding to the management key storage unit, the MKI being used to correspond to the encrypted software section, wherein the decryption unit invokes corresponding MK according to the MKI and decrypting the encrypted software section, and directly transfers the decrypted software code and/or data to the processing and cache unit.

In addition, every management key storage unit may correspond to one or more management key index MKI as required.

For software to be processed, first the management key encrypted with device key MK-DK corresponding to the software is stored in the cryptographic unit 120. Then, the encrypted management key MK-DK is decrypted with the device key DK to obtain the management key MK.

Store the management key MK in a management key storage unit, and obtain the corresponding management key index MKI of the management key storage unit, wherein every management key storage unit has a corresponding management key index. Then, the MKI is associated with the encrypted software section.

Therefore, when the central processing unit needs to process the encrypted software section associated with a MKI, the corresponding MK could be obtained based on the MKI. The encrypted software section is decrypted in the cryptographic unit with the management key. The decrypted software code and/or data will be directly transferred to the processing and cache unit and processed therein.

According to the present invention, the protected code and/or data will never be decrypted by a software routine and be stored in a storage means accessible to a user, e.g. memory, hard disk, etc. In the contrary, the hardware decryption unit according to the present invention is embedded in a central processing unit CPU, and encrypted code and/or data are decrypted and fed to CPU directly. For the reason that a user can not have access to the plain code and/or data of protected contents, e.g. data and/or code in plain format will never appear in storage means accessible to a user, intercepting these contents by malicious user is effectively avoided.

According to some predetermined strategy to be stated below, access to the protected content can be further limited to the authorized code only. Thus, intercepting these protected contents by malicious user is further effectively avoided.

However, this purpose is hardly to be achieved by existing protection method, especially by protection method based on software.

For software with encrypted section to be processed, as shown in FIG. 1, the software could be stored in memory by means of pages. The encrypted section and unencrypted section could be stored in encrypted pages and plain pages respectively. A page table 150 might be created, and the page address of encrypted pages and the address of plain pages could be associated with MKIs of decrypted MK as required. Thus, CPU will process encrypted software section and unencrypted software section separately according to the associated MKI. A person skilled in the art could understand that other methods could be used to associate a MKI with encrypted software section, e.g. addition of a header to an encrypted software section to indicate its corresponding MKI. In the circumstance that the CPU will process a plurality of encrypted software, the MKIs corresponding to their respective MK could be associated with the software separately.

Associating management key and encrypted software section enables the central processing unit according to the present invention to process a plurality of encrypted software, or a plurality of software with encrypted sections.

According to another aspect of the present invention, the decryption unit directly transfers the decrypted software code and/or data together with corresponding MKI to the processing and cache unit, the processing and cache unit processes the decrypted software code and/or data according to the MKI.

For the CPU and method according to the present invention, the processing and cache unit might further transfer the processed software code and/or data together with corresponding MKI to the cryptographic unit; the cryptographic unit further comprises an encryption unit for invoking the corresponding MK according to the MKI to encrypt the processed software code and/or data, and output the encrypted software code and/or data together with the corresponding MKI.

For the CPU and method according to the present invention, the central processing unit might be further configured to process a plurality of encrypted software, each encrypted software is encrypted with a different MK, and different MKs are encrypted with the DK respectively. The decryption unit is further configured to decrypt the encrypted MKs to obtain MKs, store the MKs to the management key storage units and output MKIs corresponding to the management key storage units, thus the MKIs associates to the plurality of encrypted software respectively. Thus, encrypted sections of same software or same encrypted software could be associated with same MKI, or software encrypted with same MK is associated with same MKI.

For the CPU and method according to the present invention, the decryption unit might allocate management key storage unit and MKIs to MKs based on a predetermined strategy, the processing and cache unit processes the decrypted software code and/or data based on a predetermined strategy. The predetermined strategy comprises: for code and/or data associated with a MKI could only be accessed by code with same MKI; or for code and/or data associated with a MKI could only be accessed by code with certain MKI according to the strategy. For example, code with corresponding MKIs in a certain range could have access to each other. However, codes with different MKI, or code without MKI might be allowed to invoke each other.

In the application, code and/or data associated with a MKI might be one or more of the following: encrypted code and/or data associated with a MKI; decrypted code and/or data associated with a MKI; and code and/or data resulted from intermediate processing code and/or data associated with a MKI. Code and/or data associated with a MKI could only maintain its MKI identifier before being decrypted. As a preferred embodiment, code and/or data related with a MKI could also maintain their MKI identifier in cache, or in different sections of the central processing unit.

For the CPU and method according to the present invention, the processing and cache unit might further comprise a secret register set, the predetermined strategy comprises: for code and/or data stored in the secret register set and associated with a MKI could only be accessed by code with same MKI; or for code and/or data stored in the secret register set and associated with a MKI could only be accessed by code with certain MKI according to the strategy, for example, code with corresponding MKIs in a certain range could have access to each other.

For a CPU as required, as shown in FIG. 1, the processing and cache unit might comprise processing section and cache section. The cache section might comprise control unit, cache line and corresponding MKI identifier part. The processing section might comprise execution unit, current instruction register and its corresponding MKI storage part, secret register set, register (the register may or may not have corresponding MKI identification or storage part) and other parts. A person skilled in the art could understand, according to the present invention and other requirement of CPU, the processing and cache section might use other configuration without departing from the invention. For example, the processing and cache section might not use MKI and secret register set. Thus, the cryptographic unit will protect the encrypted software by separation as described before and after.

According to the present invention, the cryptographic unit and other protection unit are embedded in CPU. This configuration is different from existing technology that integrates all units for protecting program execution into a coprocessor. Thus, the CPU and computer keep their existing structure, and the existing structure is transparent to traditional software including operating system and applications. The traditional software will not be aware of the hardware based tamper resistance feature. To support this tamper resistance feature, e.g. for operating system to store software, operating system will separately store encrypted section and unencrypted section. By this way, it is easier to associate encrypted section with MKI. Therefore, it is easier for applications to implement tamper resistance technology while keeping the original working, development, deployment, and distribution of software.

As described above, traditional tamper resistance technology based on software encrypts sensitive data and/or code of software to make interception more difficult. Traditional tamper resistance technology based on hardware integrates all the parts related with tamper resistance in a separate coprocessor and run the protected software in the coprocessor.

In the present invention, cryptographic unit and other protection units are embedded in CPU, and managed with MKI. FIG. 1 shows a structure according to one embodiment of the present invention. The cryptographic unit is allocated in CPU and at the most outside of data stream of CPU. Generally, it can be allocated between cache and outside data bus.

The protected software sections (data and/or code) are always encrypted when they are stored outside CPU. When CPU read the encrypted contents, decryption unit decrypts the content to be plain text suitable for processing by CPU. When CPU is to write the content of encrypted sections to memory or storage means, encryption unit encrypts the content before they are sent out CPU. In the present invention, the protected contents (data and/or code) are always encrypted when the contents are outside CPU. The right for access to the protected content is limited to authorized code.

FIG. 1 shows an encryption CPU according to one embodiment of the present invention. The encryption CPU has but is not limited to the following features.

1. Every CPU is assigned with one or several device keys (DK) for the conditional (authorized) access to protected software.

2. The protected sections of software are encrypted by a management key (MK). Commonly the MK is different from DKs for easy distribution. MK could be randomly generated for each application when the application is distributed.

3. The MK is encrypted with selected DKs and distributed with the application or separately if a separate MK from the DK is selected. Commonly both broadcast encryption, e.g. Media Key Block (MKB), and simple PKI are choices for MK distribution.

4. The cryptographic unit in CPU may keep an internal list of MKs for all running applications.

5. The MK distributed with protected application is decrypted with proper DK and an available item from the internal MK list is allocated to store the application MK. Commonly the operating system invokes CPU to complete this process before the application is loaded, and the index of MK (MKI) in the internal MK list instead of the MK itself is returned to the operating system.

6. The MKI is utilized to construct data structure for the execution of protected applications. Commonly the operating system needs to construct the page table properly with the corresponding MKI.

7. The encryption unit/decryption unit decrypts/encrypts the protected sections properly according to the associated MKI.

8. The privilege of accessing protected content is restricted to the authorized code. A typical option is to restrict that only code from the protected section with the same MKI could read and write the protected content. Unauthorized code could only read the protected content.

9. A special secret register set could be implemented with specific access policy to restrict the usage of register. A typical option of access policy is to restrict that only code with the same MKI could read and write the plain form value in a register with same MKI. Other code could only read and write encrypted value in a register (be encrypted by a MK with same MKI).

10. When operating system switch between tasks, content in the current register set is saved in memory, and the content for register set of the task to be processed is loaded from memory. If the register set is secret register set, the value in memory is encrypted value.

The preferred embodiments of the present invention have been described in detail. However, one skilled in the art will realize that the preferred embodiments are only given for the purpose of illustration, and should not be construed as limiting the preset invention thereto. This invention can be implemented by way of software, hardware or the combination of the two. One skilled in the art can make various modifications and variations to the present invention; however, these modifications and variations are all within the scope and spirit of the invention as defined in the accompanying claims.

What is claimed is:

1. A central processing unit for processing at least one encrypted software, wherein the encrypted software comprises at least one encrypted software section, the encrypted software section being encrypted with a particular management key MK and stored in a memory area, the MK being encrypted with a device key DK as an encrypted MK, the central processing unit comprising:
a processing and cache unit;
a cryptographic unit, comprising:
a device key storage unit for storing the DK;
a plurality of management key storage units for storing MKs, wherein each management key storage unit corresponds to a management key index MKI;
a decryption unit for decrypting an encrypted MK with the DK to obtain a MK, storing the MK to a management key storage unit, and outputting a MKI corresponding to the management key storage unit, the MKI being used to identify a location of the encrypted software section in the memory area;
the cryptographic unit outputting the MKIs to the processing and cache unit, and the processing and cache unit storing the MKIs;
the processing and cache unit transferring software and one of the MKIs to the cryptographic unit, and the cryptographic unit using said one of the MKIs to obtain one of the MKs, and using said MKs to encrypt the software transferred from the processing and cache unit;
wherein the MKI corresponding to said particular MK is used both to identify the location of the particular MK, and to identify the location in the memory area of the encrypted software section encrypted by the particular MK; and wherein, the decryption unit invokes the corresponding MK according to the MKI and decrypts the encrypted software section, and directly transfers the decrypted software from the decryption unit to the processing and cache unit.

2. The central processing unit according to claim 1, wherein the decryption unit directly transfers the decrypted software together with the corresponding MKI to the processing and cache unit, and the processing and cache unit processes the decrypted software code according to the MKI.

3. The central processing unit according to claim 2, wherein the processing and cache unit further transfers specified software together with the corresponding MKI to the cryptographic unit; the cryptographic unit further comprises an encryption unit for invoking the corresponding MK according to the MKI to encrypt the specified software and output the encrypted software together with the corresponding MKI.

4. The central processing unit according to claim 1, for processing a plurality of encrypted software, each encrypted software is encrypted with a different MK, the different MKs are encrypted with the DK respectively, the decryption unit is further configured to decrypt the encrypted MKs to obtain the MKs, store the MKs to the management key storage units and the output MKIs corresponding to the management key storage units, wherein the MKIs associate to the plurality of encrypted software respectively.

5. The central processing unit according to claim 4, wherein the decryption unit allocates management key storage units and the MKIs to the MKs based on a predetermined allocation strategy, and the processing and cache unit processes the decrypted software based on a predetermined processing strategy.

6. The central processing unit according to claim 5, wherein the predetermined processing strategy comprises: code associated with a MKI can only be accessed by code with same MKI; or code associated with a MKI can only be accessed by code with certain MKI according to the strategy.

7. The central processing unit according to claim 5, wherein the processing and cache unit further comprises a secret register set, the predetermined processing strategy comprises: code stored in the secret register set and associated with a MKI can only be accessed by code with same MKI; or code stored in the secret register set and associated with a MKI can only be accessed by code with certain MKI according to the strategy.

8. A method for processing at least one encrypted software with a central processing unit, wherein the central processing unit comprises a processing and cache unit, and a cryptographic unit, and the cryptographic unit comprises a decryption unit, a device key storage unit for storing a device key DK, and a plurality of management key storage units for storing management keys MKs, wherein each management key storage unit corresponds to a management key index MKI, the encrypted software being encrypted with a management key MK and stored in a memory area, the MK being encrypted with a device key DK as an encrypted MK, the method comprising:

storing the encrypted MK corresponding to the encrypted software into the cryptographic unit;

using a decryption unit for decrypting an encrypted MK with the DK to obtain a MK;

storing the obtained MK in a management key storage unit, and obtaining a MKI corresponding to the management key storage unit;

associating the obtained MKI with the encrypted software, wherein the obtained MKI identifies both the location of the obtained MK, and the location in the memory area of the encrypted software;

invoking corresponding MK according to the obtained MKI and decrypting the encrypted software with the MK in the cryptographic unit;

directly transferring the decrypted software code and/or data to the processing and cache unit, and processing the decrypted software with the processing and cache unit;

the cryptographic unit outputting the MKIs to the processing and cache unit, and the processing and cache unit storing the MKIs; and the processing and cache unit transferring software and one of the MKIs to the cryptographic unit, and the cryptographic unit using said one of the MKIs to obtain one of the MKs, and using said one of the MKs to encrypt the software transferred from the processing and cache unit.

9. The method according to claim 8, wherein the decryption unit directly transfers the decrypted software together with the corresponding MKI to the processing and cache unit, and the processing and cache unit processes the decrypted software code and/or data according to the MKI.

10. The method according to claim 9, wherein the processing and cache unit further transfers specified software together with the corresponding MKI to the cryptographic unit; and the cryptographic unit further comprises:

an encryption unit for invoking the corresponding MK according to the MKI to encrypt the specified software, and outputting the encrypted software together with the corresponding MKI.

11. The method according to claim 8, for processing a plurality of encrypted software, wherein each encrypted software is encrypted with a different MK, and different MKs are encrypted with the DK respectively, the method further comprises:

using the decryption unit to decrypt the encrypted MKs with the DK to obtain the MKs, to store the MKs to the management key storage units and to output MKIs corresponding to the management key storage units, wherein the MKIs associate to the plurality of encrypted software respectively.

12. The method according to claim 11, wherein the decryption unit allocates management key storage unit and the MKIs to the MKs based on a predetermined allocation strategy, and the processing and cache unit processes the decrypted software code and/or data based on a predetermined processing strategy.

13. The method according to claim 12, wherein the predetermined processing strategy comprises: code associated with a MKI can only be accessed by code with the same MKI; or code associated with a MKI can only be accessed by code with certain MKI according to the processing strategy.

14. The method according to claim 8, wherein the processing and cache unit further comprises a secret register set, and the predetermined processing strategy comprises: code stored in the secret register set and associated with a MKI can only be accessed by code with the same MKI; or code stored in the secret register set and associated with a MKI can only be accessed by code with certain MKI according to the processing strategy.

15. The method according to claim 1, wherein:

the memory area includes a plurality of pages holding the encrypted software; and the MKI corresponding to the particular MK is stored in a page table, said page table identifying all of the pages in the memory area that hold encrypted software encrypted by the particular MK.

* * * * *